United States Patent
Nakamura

(10) Patent No.: US 8,186,836 B2
(45) Date of Patent: May 29, 2012

(54) MOBILE PROJECTOR APPARATUS AND METHOD OF CONTROLLING THE SAME

(75) Inventor: Hisashi Nakamura, Kobe (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 356 days.

(21) Appl. No.: 12/412,230

(22) Filed: Mar. 26, 2009

(65) Prior Publication Data

US 2009/0244490 A1    Oct. 1, 2009

(30) Foreign Application Priority Data

Mar. 27, 2008   (JP) .................................. 2008-082385

(51) Int. Cl.
  *G03B 21/20*   (2006.01)
(52) U.S. Cl. ................ 353/85; 353/60; 353/63; 353/52; 353/57; 353/61; 353/69; 353/70; 353/101; 353/119; 353/122
(58) Field of Classification Search .................... 353/63, 353/70, 60, 85, 52, 57, 61, 97, 119, 122; 345/1.1, 32, 169, 905, 158, 156, 166, 168, 345/173; 348/771, 742, 743; 250/205, 559.13, 250/559.15, 206.1, 206.2, 201.1, 221, 222.1
See application file for complete search history.

(56) References Cited

U.S. PATENT DOCUMENTS

| | | | | |
|---|---|---|---|---|
| 7,284,866 B2* | 10/2007 | Buchmann | | 353/42 |
| 7,411,660 B2* | 8/2008 | Cho et al. | | 356/3.01 |
| 7,635,189 B2* | 12/2009 | DeCusatis et al. | | 353/84 |
| 7,883,221 B2* | 2/2011 | Nozaki et al. | | 353/122 |
| 2004/0211883 A1* | 10/2004 | Imagawa et al. | | 250/208.1 |
| 2005/0068505 A1* | 3/2005 | Momose et al. | | 353/97 |
| 2005/0151934 A1* | 7/2005 | Akutsu | | 353/69 |
| 2007/0249396 A1* | 10/2007 | Nitta et al. | | 455/556.1 |
| 2008/0036975 A1* | 2/2008 | Yang et al. | | 353/57 |
| 2009/0012725 A1* | 1/2009 | Vaananen | | 702/41 |
| 2009/0141245 A1* | 6/2009 | Nozaki et al. | | 353/56 |

FOREIGN PATENT DOCUMENTS

JP       2002-261889 A    9/2002

* cited by examiner

*Primary Examiner* — Georgia Y Epps
*Assistant Examiner* — Sultan Chowdhury
(74) *Attorney, Agent, or Firm* — NDQ&M Watchstone LLP

(57) ABSTRACT

A mobile projector apparatus includes a light source, a modulation unit modulating light of the light source using a picture signal, a projection lens magnifying and projecting the modulated light of the light source, a battery supplying electric power to the light source, an acceleration measuring unit measuring an acceleration applied to the mobile projector apparatus, a usage state detecting unit detecting whether or not the mobile projector apparatus is in an unused state, and an extinguishing unit extinguishing the light source based on outputs of the acceleration measuring unit and the usage state detecting unit.

4 Claims, 7 Drawing Sheets

FIG.2A
FIG.2B
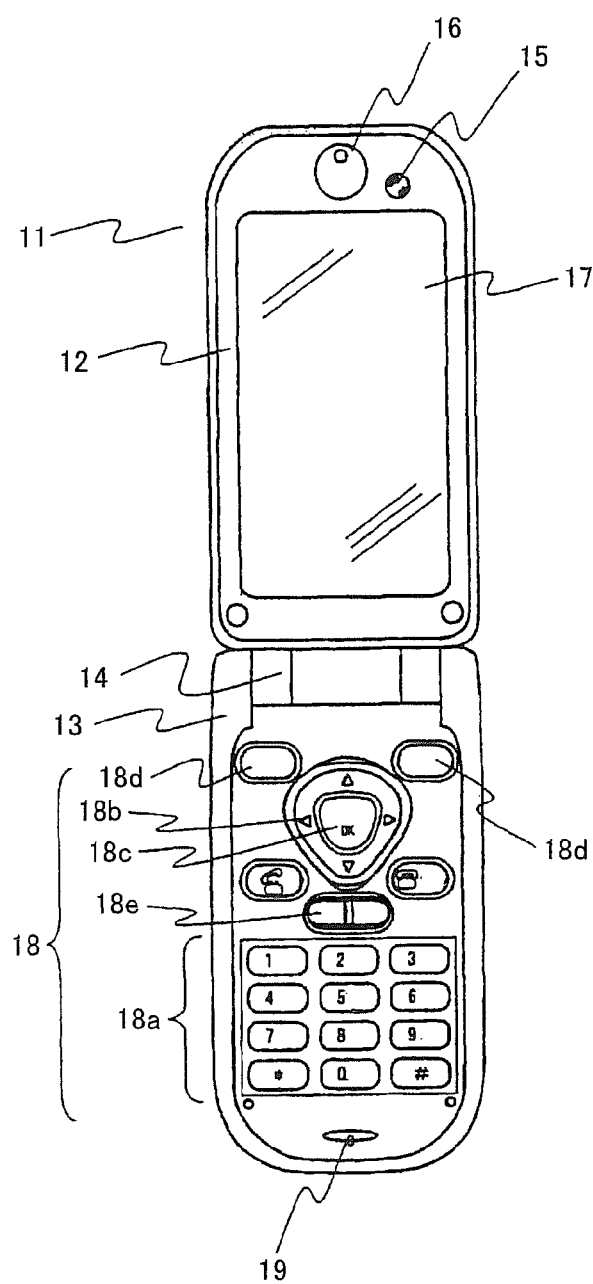
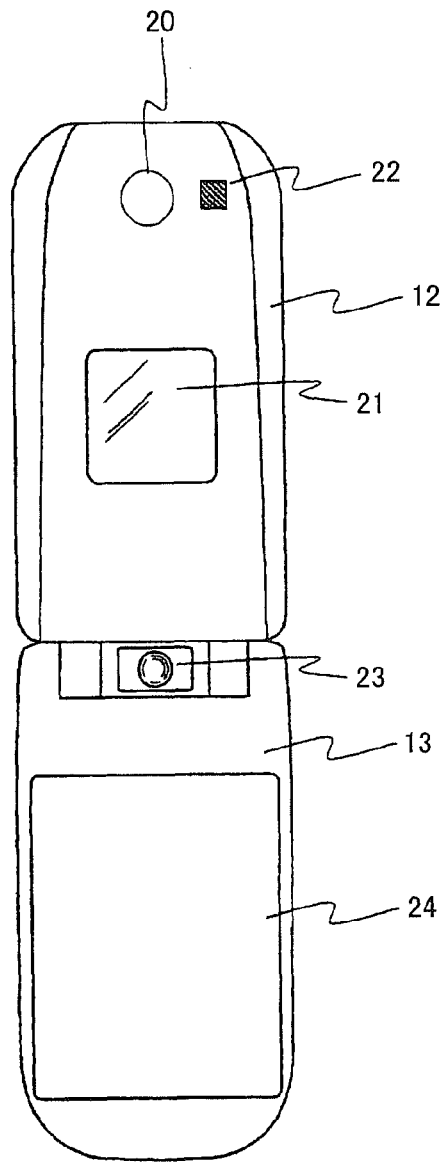

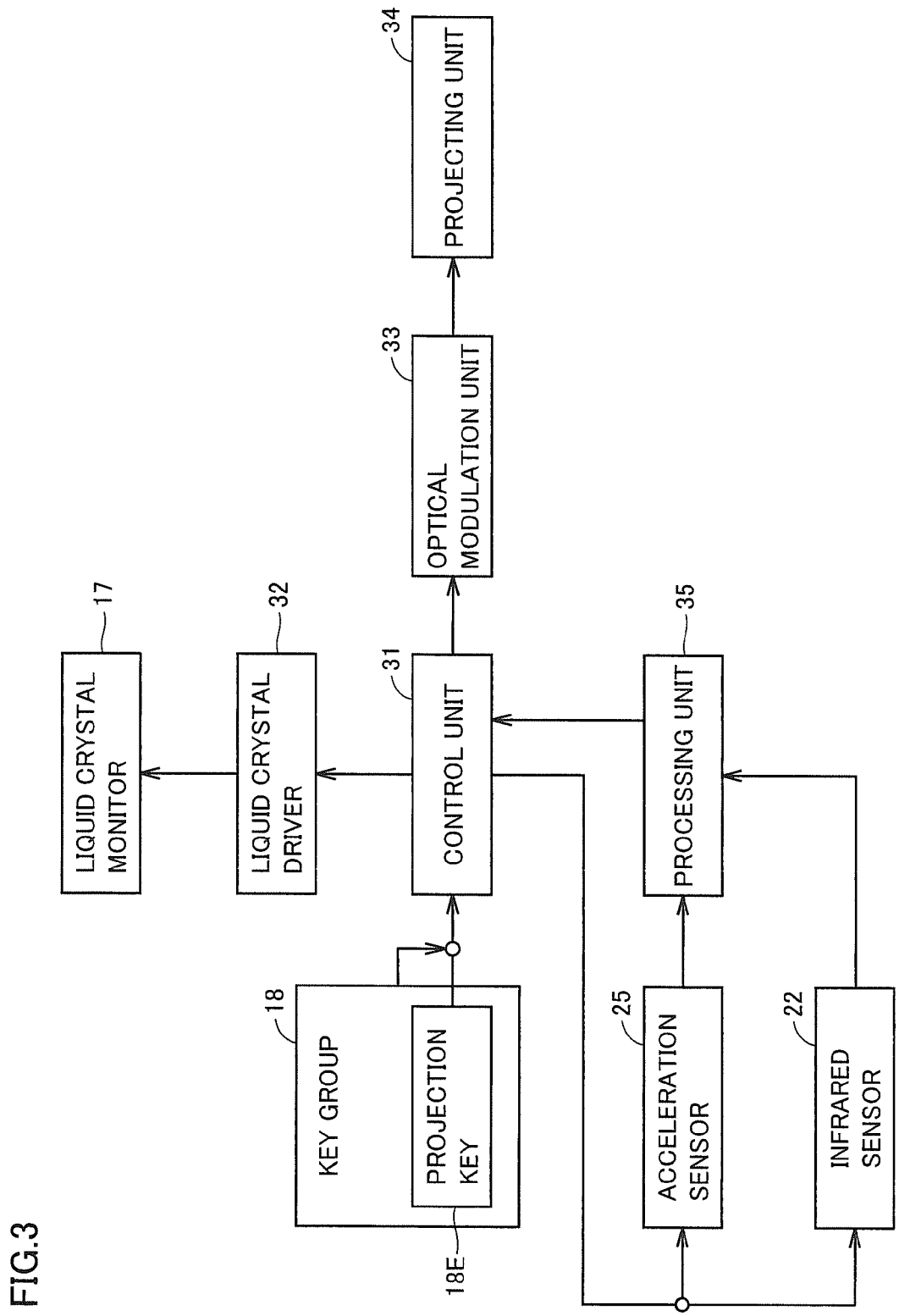

MOBILE PROJECTOR APPARATUS AND METHOD OF CONTROLLING THE SAME

BACKGROUND OF THE INVENTION

1. Field of the Invention

The present invention relates to a control technique for reducing electric power wasted for projection in a mobile projector apparatus having a projector function.

2. Description of the Background Art

Conventionally, some of portable, small-sized, and light-weight mobile terminals 101 represented by mobile phones and the like have a function of projecting a picture, as shown in FIG. 7. Specifically, mobile terminal 101 includes a projecting unit 102 and a projection key 103. Projecting unit 102 is disposed at a lower portion of mobile terminal 101 to modulate light from a light source and project a picture. Projection key 103 is disposed on an outer wall surface of mobile terminal 101 to switch on/off the projection of the picture from projecting unit 102 each time when it is pressed down.

With the configuration described above, a picture 105 having a size larger than a display size displayed on a display panel 104 such as a liquid crystal monitor of mobile terminal 101 can be projected from projecting unit 102, and a plurality of people can simultaneously confirm the picture.

However, since the amount of light of a light source in a small-sized mobile terminal is smaller than that of an ordinary projector, when a user accidentally turns on the light source in a bright place such as in the daytime, the user may put the mobile terminal into his/her pocket or bag with the light source illuminated, without noticing it. This results in a waste of a battery.

SUMMARY OF THE INVENTION

In view of the circumstances described above, one object of the present invention is to prevent a battery from being wasted by unintentional illumination of a light source due to a user's carelessness.

A mobile projector apparatus according to an aspect of the present invention includes a light source, a modulation unit modulating light of the light source in response to a picture signal, a projection lens magnifying and projecting the modulated light of the light source, a battery supplying electric power to the light source, an acceleration measuring unit measuring an acceleration applied to the mobile projector apparatus, a usage state detecting unit detecting whether or not the mobile projector apparatus is in an unused state, and an extinguishing unit extinguishing the light source based on outputs of the acceleration measuring unit and the usage state detecting unit.

A mobile projector apparatus according to another aspect of the present invention includes a light source, a modulation unit modulating light of the light source in response to a picture signal, a projection lens magnifying and projecting the modulated light of the light source, a battery supplying electric power to the light source, an acceleration measuring unit measuring an acceleration applied to the mobile projector apparatus, a usage state detecting unit detecting whether or not the mobile projector apparatus is in an unused state, and an output adjusting unit reducing an output of the light source based on outputs of the acceleration measuring unit and the usage state detecting unit.

A method of controlling a mobile projector apparatus of the present invention is applied to a mobile projector apparatus including a light source, a modulation unit modulating light of the light source in response to a picture signal, a projection lens magnifying and projecting the modulated light of the light source, and a battery supplying electric power to the light source. The method includes the steps of measuring an acceleration applied to the mobile projector apparatus, detecting whether or not the mobile projector apparatus is in an unused state, and reducing an output of the light source based on a measurement result of the acceleration and a detection result of the unused state.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 2A and 2B are schematic diagrams of a projector function-equipped mobile phone (hereinafter referred to as a PJ mobile phone) in accordance with the first embodiment.

FIG. 3 is a block diagram showing a configuration of the PJ mobile phone in accordance with the first embodiment.

DESCRIPTION OF THE PREFERRED EMBODIMENTS

First Embodiment

Hereinafter, a first embodiment in accordance with the present invention will be described with reference to FIGS. 1 to 4.

Figure 1:
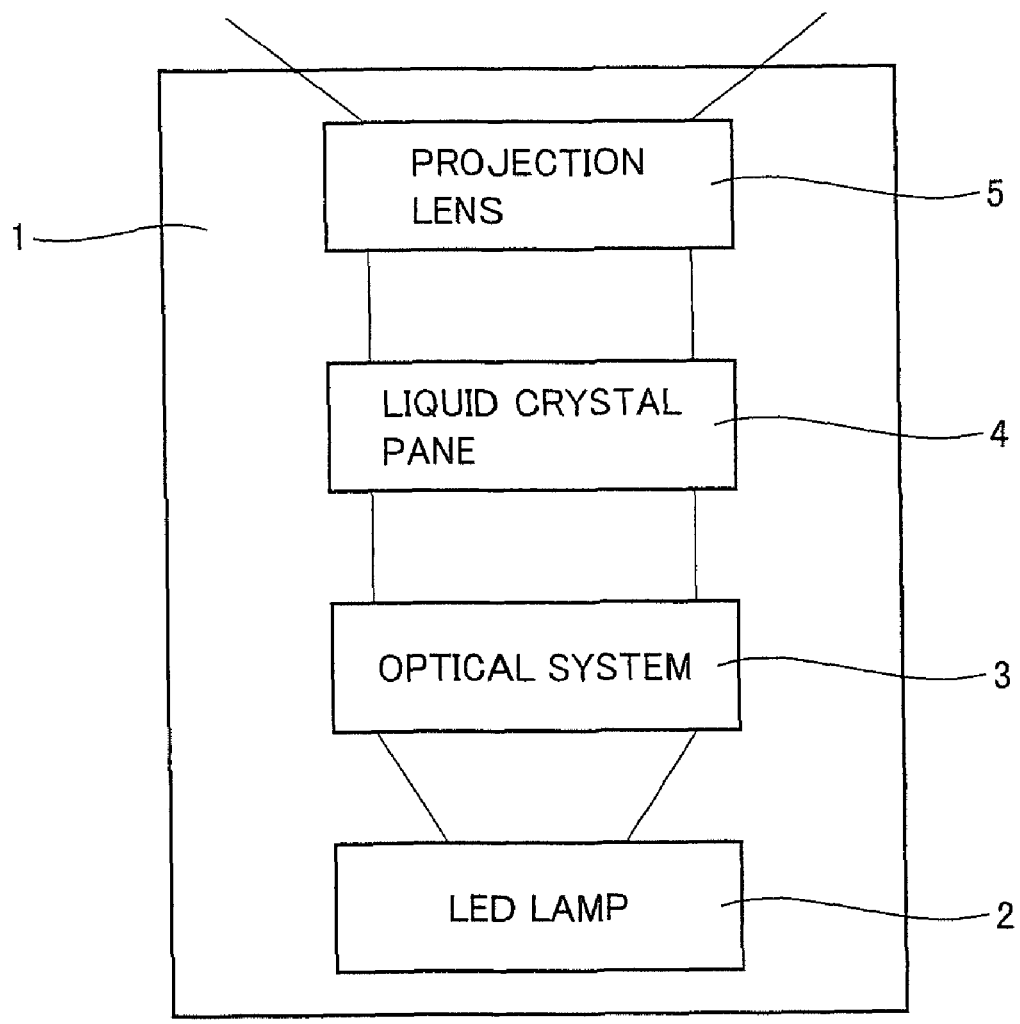
FIG. 1 is a conceptual diagram of an optical system of a super-small projection picture display apparatus in accordance with a first embodiment.

FIG. 1 shows an optical system of a super-small projection picture display apparatus 1 installed in a mobile projector apparatus in accordance with the first embodiment, as a conceptual diagram.

An LED lamp 2 is used as a light source for a picture to be projected from the super-small projection picture display apparatus 1, and its brightness level can be changed by controlling electric power. Emitted light is guided to an optical system 3.

Optical system 3 is configured to have a function of averaging partial unevenness in brightness present in the light from LED lamp 2 and reducing a difference in the amounts of light in a central portion and a peripheral portion of a picture plane, a function of changing the direction of polarization, a function of changing the traveling direction of an optical path, and the like. Optical system 3 modulates the light from LED lamp 2, and guides the light to a liquid crystal panel 4.

Liquid crystal panel 4 is an optical element formed by encapsulating liquid crystal. The light guided to liquid crystal panel 4 is converted into a picture in response to a picture signal, and guided to a projection lens 5. The light converted into a picture is magnified and projected from projection lens 5 onto a projection receiving surface not shown.

FIGS. 2A and 2B exemplarily show an appearance of a PJ mobile phone as the mobile projector apparatus in accordance with the first embodiment, in which FIG. 2A is a front view, and FIG. 2B is a rear view.

A PJ mobile phone 11 is a foldable PJ mobile phone having an upper casing 12 and a lower casing 13 connected by a hinge portion 14.

As shown in FIG. 2A, upper casing 12 is provided with a video phone camera 15, a speaker 16 converting a sound signal into a sound, and a liquid crystal monitor 17 displaying display information. Lower casing 13 is provided with a key group 18 including numeric keys 18a, a direction key 18b, a determination key 18c, an application key 18d, a projection key 18e, and the like, and a microphone 19 converting a sound into a sound signal.

Further, as shown in FIG. 2B, upper casing 12 is provided with a projecting unit 20, a sub liquid crystal monitor 21, and an infrared sensor 22. Projecting unit 20 projects a projection picture. Sub liquid crystal monitor 21 displays sub display information required when PJ mobile phone 11 is closed. Infrared sensor 22 is disposed on an identical plane on which projecting unit 20 is disposed, to measure a distance from PJ mobile phone 11 to an object by emitting an infrared ray, receiving the infrared ray reflected by the object, and measuring time from the emission to the reception. Projecting unit 20 corresponds to a projecting unit 34 described later.

Lower casing 13 is provided with a mobile camera 23 taking a surrounding picture, and a storage portion storing a built-in battery 24. Built-in battery 24 is substantially rectangular solid and chargeable, and supplies electric power to electronic components in PJ mobile phone 11 when electric power cannot be supplied by wire from a fixed power supply, for example when PJ mobile phone 11 is carried.

Since infrared sensor 22 can measure the distance from PJ mobile phone 11 to the object, when PJ mobile phone 11 is being carried unused, that is, placed in a pocket, a bag, or the like, infrared sensor 22 detects a value indicating that the distance is short.

Further, although not shown in FIGS. 2A and 2B, PJ mobile phone 11 is provided with an acceleration sensor 25 (see FIG. 3). Acceleration sensor 25 is formed of a weight having an accurately known amount of weight and a beam supporting the weight and having an electric resistance.

When the weight receives an acceleration, the weight acquires a force to move, and the beam supporting the weight is deformed. The resistance value of the beam is changed by the deformation. Then, acceleration sensor 25 measures the acceleration applied to PJ mobile phone 11 based on the change in the resistance value of the beam.

FIG. 3 shows a configuration provided to PJ mobile phone 11 related to means for extinguishing LED lamp 2, in a block diagram.

Key group 18 is operated by a user, and thereby converts an operation of PJ mobile phone 11 desired by the user into an electric signal and transmits the electric signal to a control unit 31.

When projection key 18e is pressed by the user whenever he/she desires to project a picture, projection key 18e transmits a projection signal to control unit 31. Further, when projection key 18e is pressed again, projection key 18e transmits a projection canceling signal to control unit 31.

Control unit 31 provides a liquid crystal driver 32 with an instruction on whether or not to cause liquid crystal monitor 17 to synchronously display a picture while the picture is being projected in response to the electric signal from key group 18, and can control driving of liquid crystal monitor 17. Control unit 31 also drives an optical modulation unit 33 in response to the projection signal from projection key 18e described above to project a picture from a projecting unit 34. Further, control unit 31 stops optical modulation unit 33 in response to the projection canceling signal described above to stop the projection of the picture from projecting unit 34. Furthermore, control unit 31 controls driving of acceleration sensor 25 and infrared sensor 22 described below, and provides optical modulation unit 33 with an instruction to extinguish LED lamp 2 in response to a signal from a processing unit 35 described below.

Acceleration sensor 25 detects the acceleration applied to PJ mobile phone 11, and transmits the result to processing unit 35.

Infrared sensor 22 measures the distance from PJ mobile phone 11 to the object, and transmits the result to processing unit 35.

Processing unit 35 stores a threshold value of an acceleration generated when PJ mobile phone 11 is being carried. When the result detected by acceleration sensor 25 is not less than the threshold value, processing unit 35 transmits the result detected by acceleration sensor 25 to control unit 31.

Processing unit 35 also stores the distance to a surrounding object indicating that PJ mobile phone 11 is being carried in an unused state, as a threshold value. When the result measured by infrared sensor 22 is not more than the threshold value, processing unit 35 transmits the result measured by infrared sensor 22 to control unit 31.

Figure 4:
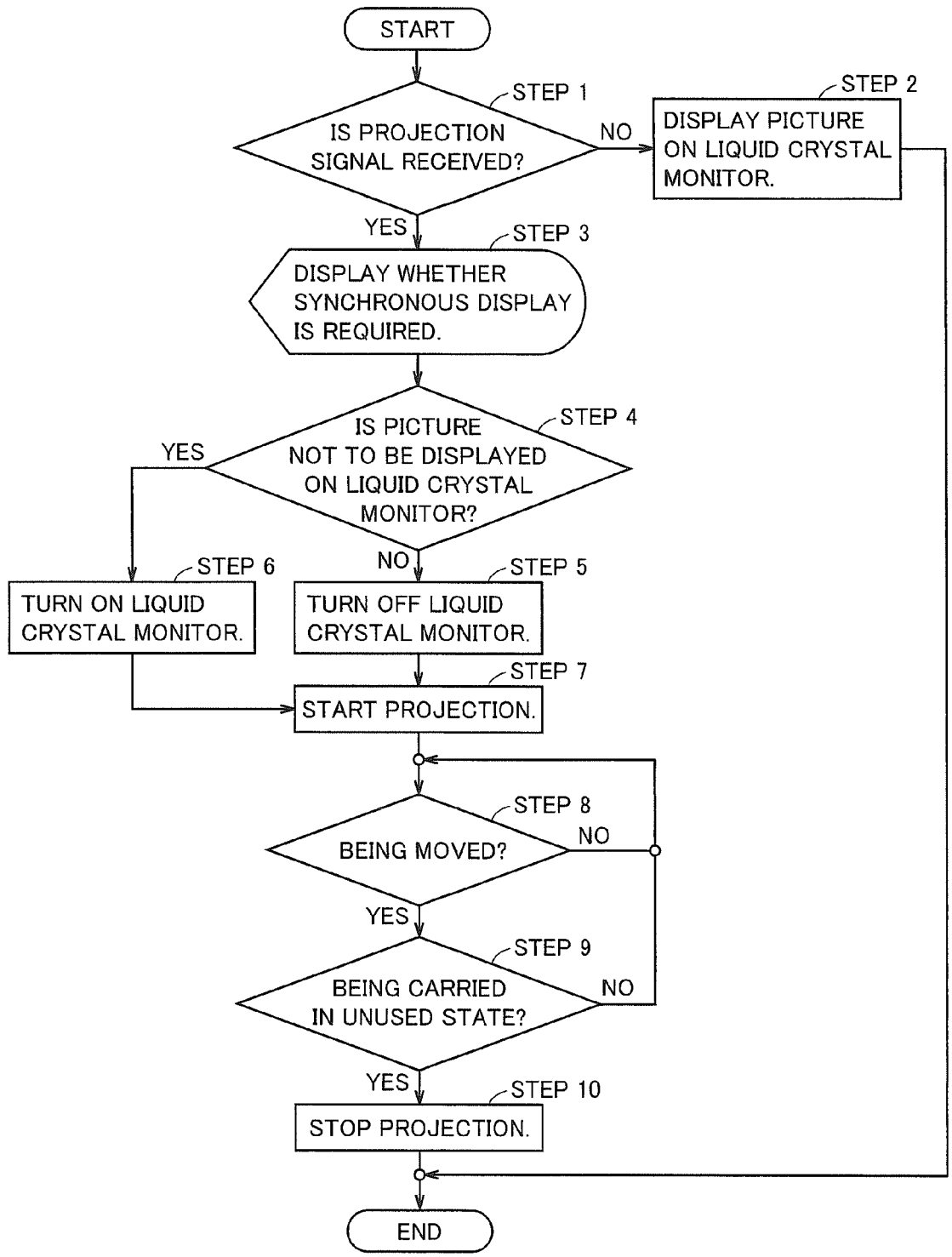
FIG. 4 is a flowchart of control for extinguishing an LED (Light Emitting Diode) lamp in accordance with the first embodiment.

FIG. 4 shows a control method related to the means for extinguishing LED lamp 2, in a flowchart.

If control unit 31 does not receive the projection signal from projection key 18e (NO in step 1), control unit 31 causes liquid crystal monitor 17 to display a picture (step 2) and terminates the process, as there is no need to project the picture from projection lens 5. If control unit 31 receives the projection signal from projection key 18e (YES in step 1), control unit 31 causes liquid crystal monitor 17 to display a message for confirming whether or not to synchronously display a picture on liquid crystal monitor 17 via liquid crystal driver 32 while the picture is being projected from projecting unit 20 (step 3).

After step 3, the user determines whether or not to cause liquid crystal monitor 17 to synchronously display the picture to be projected, by operating key group 18 (step 4).

If the picture is not to be synchronously displayed on liquid crystal monitor 17 (NO in step 4), liquid crystal monitor 17 is turned off (step 5), and if the picture is to be synchronously displayed on liquid crystal monitor 17 (YES in step 4), liquid crystal monitor 17 is turned on (step 6).

After step 5 or step 6, control unit 31 provides optical modulation unit 33 with an instruction to cause projecting unit 34 to project the picture to be projected (step 7).

After step 7, control unit 31 determines whether or not an acceleration is applied to PJ mobile phone 11 based on the detection result of acceleration sensor 25 (step 8). If PJ mobile phone 11 is in a state of being carried, acceleration sensor 25 detects an acceleration having a certain large amount of value.

If control unit 31 determines in step 8 that no acceleration is applied to PJ mobile phone 11 (NO in step 8), control unit 31 returns the process to step 8 again. If control unit 31 determines that an acceleration is applied to PJ mobile phone 11 (YES in step 8), control unit 31 measures a distance from PJ mobile phone 11 to an object based on a detection output of infrared sensor 22, and determines whether or not the distance is not less than the threshold value of the distance indicating that PJ mobile phone 11 is being carried in an unused state (step 9).

If the distance is not less than the threshold value in step 9 (NO in step 9), control unit 31 returns the process to step 8 again. If the distance is within the threshold value (YES in step 9), control unit 31 causes optical modulation unit 33 to stop the projection of the picture from projecting unit 34 (step 10).

As described above, since a waste of a battery can be prevented by providing acceleration sensor 25 and infrared sensor 22 to the mobile projector apparatus, drive time can be increased and an interval between charges can be extended. Further, since unintentional prolonged illumination of LED lamp 2 can be eliminated and heat generation can be prevented, the danger that may be posed to the user can be avoided.

In the present embodiment, infrared sensor 22 constitutes the usage state detecting unit.

Although one infrared sensor 22 is disposed on an identical plane on which projecting unit 20 is disposed, and is utilized to measure a distance to an object in the first embodiment, PJ mobile phone 11 may be provided with a plurality of infrared sensors disposed to be capable of measuring distances to an object in a plurality of directions. In this case, whether or not PJ mobile phone 11 is being carried in an unused state is determined, for example, based on whether or not the distance to the object obtained by combining detection outputs of the plurality of infrared sensors is not less than a prescribed threshold value.

Second Embodiment

Hereinafter, a second embodiment in accordance with the present invention will be described with reference to FIGS. 5 to 6.

While the control method of stopping projection from LED lamp 2 based on acceleration sensor 25 and infrared sensor 22 is employed in the first embodiment, a control method of minimizing an amount of light projected by LED lamp 2 based on acceleration sensor 25 and infrared sensor 22 is employed in the second embodiment.

Figure 5:
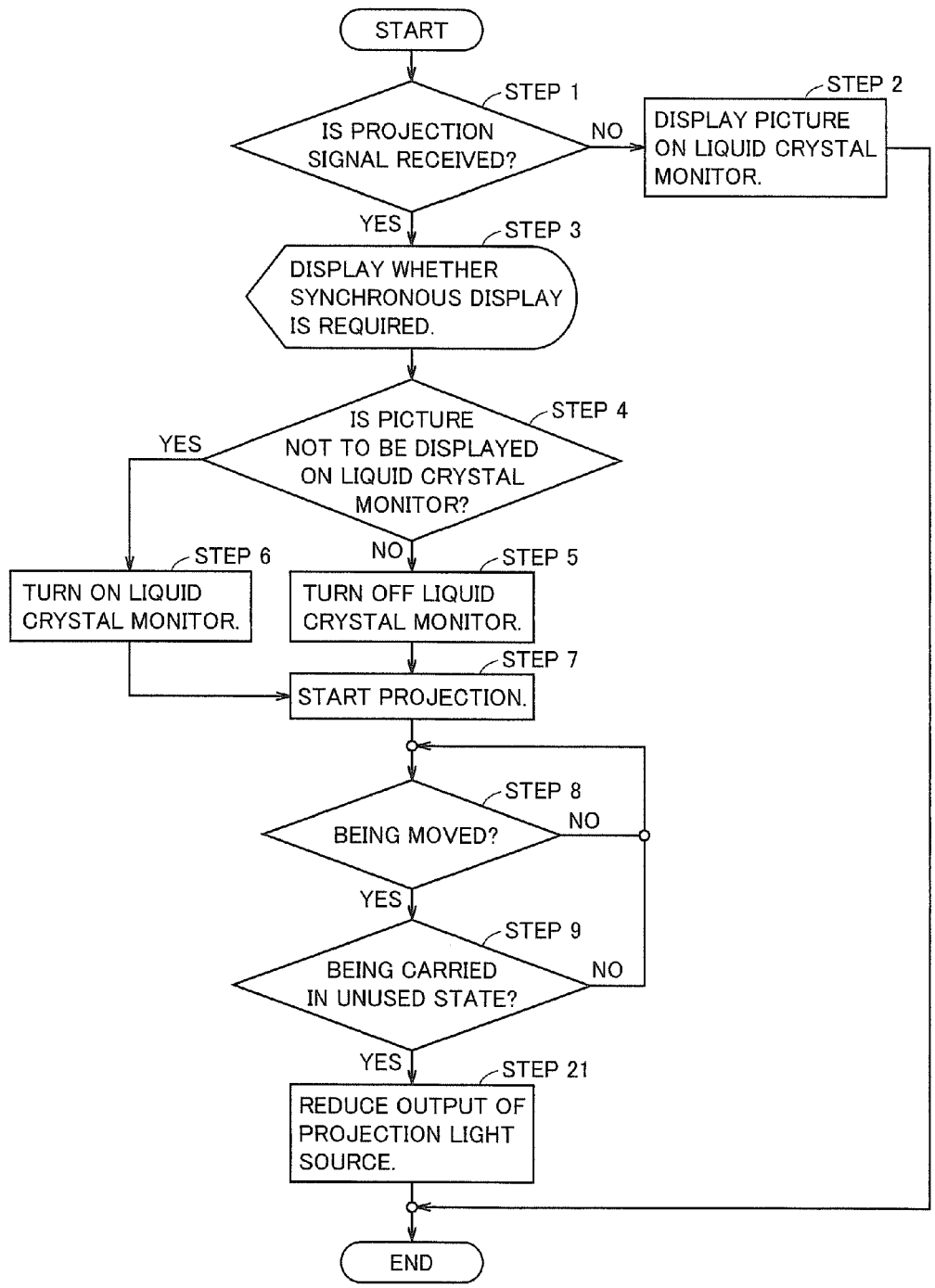
FIG. 5 is a flowchart of control for extinguishing an LED lamp in accordance with a second embodiment.

FIG. 5 shows a control method related to means for controlling electric power of LED lamp 2 of the second embodiment, in a flowchart. It is to be noted that the illustrated description of parts identical to those of the first embodiment will not be repeated.

As in the first embodiment, control unit 31 provides optical modulation unit 33 with an instruction to cause projecting unit 34 to project a picture (step 7). Then, control unit 31 determines whether or not PJ mobile phone 11 receives an acceleration by being carried, based on a detection output of acceleration sensor 25 (step 8). When control unit 31 determines that PJ mobile phone 11 is being carried in an unused state based on a detection output of infrared sensor 22 measuring a distance from PJ mobile phone 11 to an object (step 9), processing unit 35 transmits a light source output reducing signal to control unit 31.

Control unit 31 provides optical modulation unit 33 with an instruction to reduce an output of LED lamp 2 in response to the light source output reducing signal described above (step 21).

In this manner, an effect similar to that of the first embodiment can be obtained by a technique different from that of the first embodiment, i.e., reducing a drive voltage for driving LED lamp 2 and suppressing the output.

Although LED lamp 2 is employed as a light source in the present embodiment, a light source formed of a downsized extra high pressure mercury lamp, metal halide lamp, xenon lamp, or the like used for conventional projectors may be used.

The second embodiment has an effect that, since projection is stopped without completely extinguishing the light source, a delay can be suppressed when projection is restarted, and an effect that, since operations of switching between extinction and illumination are not repeated, the light source can have a prolonged life.

Figure 6:
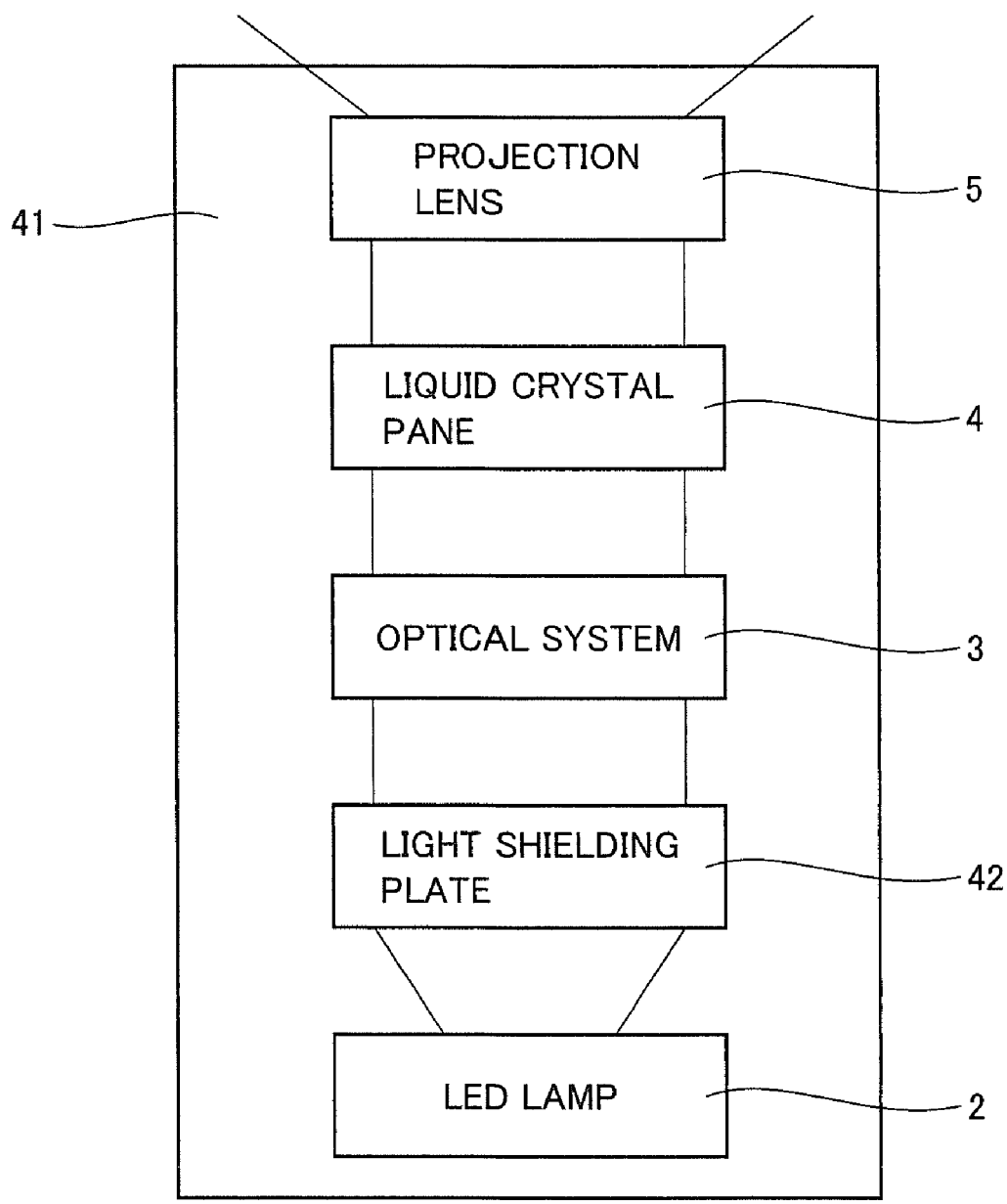
FIG. 6 is a conceptual diagram of an optical system of a super-small projection picture display apparatus in accordance with the second embodiment.
Figure 7:
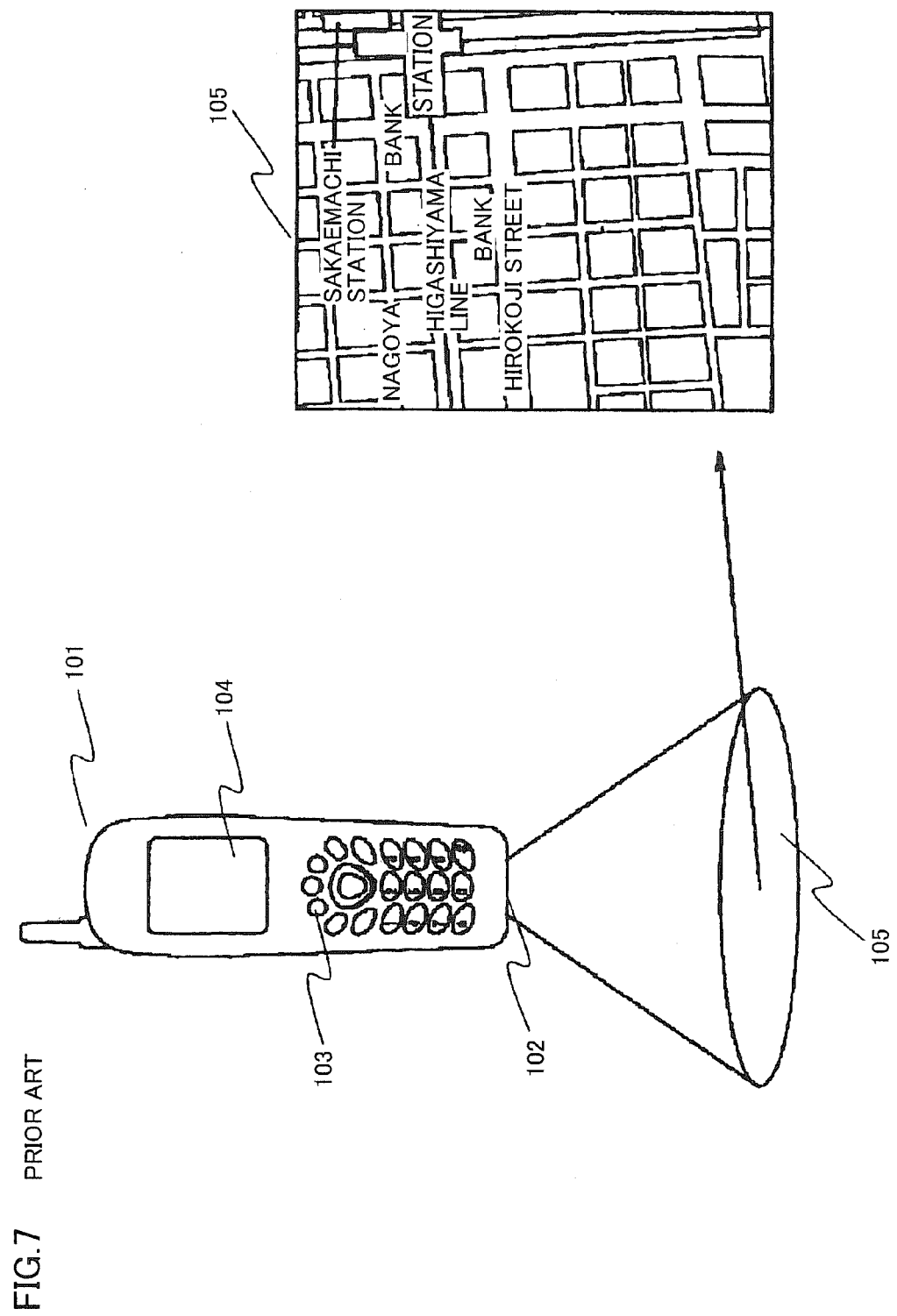
FIG. 7 is a mobile projector apparatus of prior art.

FIG. 6 conceptually shows an optical system of a super-small projection picture display apparatus 41 installed in a mobile projector apparatus in accordance with the second embodiment. In FIG. 6, an openable and closeable light shielding plate 42 is disposed between LED lamp 2 and optical system 3. When control unit 31 receives the light source output reducing signal described above, control unit 31 may reduce the output of LED lamp 2 and also close light shielding plate 42 to shield the light to be projected from projection lens 5. A location of light shielding plate 42 is not particularly limited as long as light shielding plate 42 can completely shield the light of LED lamp 2.

According to the present invention, electric power wasted for projection can be reduced in a mobile projector apparatus including a projecting unit for projecting a picture, and thus drive time can be increased and an interval between charges can be extended.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A mobile projector apparatus comprising:
a light source;
a modulation unit modulating light of said light source in response to a picture signal;
a projection lens magnifying and projecting the modulated light of said light source;
a battery supplying electric power to said light source;
an acceleration measuring unit measuring an acceleration applied to said entire mobile projector apparatus;
a usage state detecting unit detecting whether or not said mobile projector apparatus is in an unused state; and
an extinguishing unit extinguishing said light source based on outputs of said acceleration measuring unit and said usage state detecting unit.

2. A mobile projector apparatus comprising:
a light source;
a modulation unit modulating light of said light source in response to a picture signal;
a projection lens magnifying and projecting the modulated light of said light source;
a battery supplying electric power to said light source;
an acceleration measuring unit measuring an acceleration applied to said entire mobile projector apparatus;
a usage state detecting unit detecting whether or not said mobile projector apparatus is in an unused state; and
an output adjusting unit reducing an output of said light source based on outputs of said acceleration measuring unit and said usage state detecting unit.

3. The mobile projector apparatus according to claim 2, further comprising a light shielding member shielding the light emitted from said light source.

4. A method of controlling a mobile projector apparatus including a light source, a modulation unit modulating light of said light source in response to a picture signal, a projection lens magnifying and projecting the modulated light of said light source, and a battery supplying electric power to said light source, comprising the steps of:

measuring an acceleration applied to said entire mobile projector apparatus;

detecting whether or not said mobile projector apparatus is in an unused state; and reducing an output of said light source based on a measurement result of said acceleration and a detection result of said unused state.

\* \* \* \* \*